Figure 1:
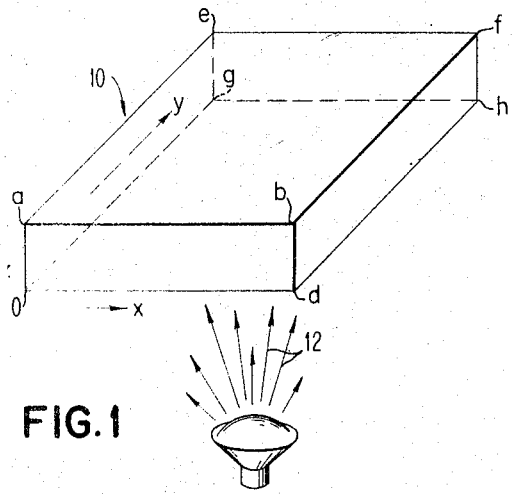

March 7, 1967 P. P. SOROKIN 3,308,395
LASERS
Filed Oct. 10, 1961 2 Sheets-Sheet 1

INVENTOR
PETER P. SOROKIN
BY Stephen J. Limanek
ATTORNEY

March 7, 1967   P. P. SOROKIN   3,308,395
LASERS
Filed Oct. 10, 1961   2 Sheets-Sheet 2

3,308,395
LASERS
Peter P. Sorokin, Ossining, N.Y., assignor to International Business Machines Corporation, New York, N.Y., a corporation of New York
Filed Oct. 10, 1961, Ser. No. 144,187
6 Claims. (Cl. 331—94.5)

This invention relates to improved optical masers or lasers and more particularly to improved active elements in optical masers or lasers.

The terms "optical maser" and "laser" are intended to be synonymous terms and are used to describe devices which by stimulated emission produce radiation in the infrared, visible or ultraviolet portions of the electromagnetic wave spectrum. The word "maser" is an acronym for microwave amplification by stimulated emission of radiation. When similar techniques are employed to produce waves within the optical region of the electromagnetic wave spectrum, the terms optical maser and laser are used, "laser" being an acronym for light amplification by stimulated emission of radiation. Optical devices of this type are capable of producing radiation which is highly directional, coherent and monochromatic.

In recent years a large amount of research and development work has been expended in attempting to develop masers and lasers as indicated by the following patents and publications:

U.S. Patents 2,836,722, "Automic or Molecular Oscillator Circuit," and 2,929,922, "Masers and Maser Communications System."

Physical Review, vol. 112, page 1940, December 1958, "Infrared and Optical Masers."

Nature, vol. 187, page 493, August 1960, "Stimulated Optical Radiation in Ruby."

British Communications and Electronics, vol. 7, page 674, 1960, "Optical Maser Action in Ruby."

Physical Review Letters, vol. 5, page 303, October 1960, "Coherence, Narrowing, Directionality, and Relaxation Oscillations in the Light Emission From Ruby."

Physical Review Letters, vol. 5, page 557, December 15, 1960, "Stimulated Infrared Emission From Trivalent Uranium."

IBM Journal of Research and Development, vol. 5, page 56, 1961, "Solid State Optical Maser Using Divalent Samarium in Calcium Fluoride."

The last five articles listed hereinabove relate to solid state lasers, that is, lasers which have as their active element a crystal containing a suitable doping material wherein electromagnetic oscillations are produced. The active element of a solid state laser is sometimes referred to as the cavity or resonator of the laser. The earliest known solid state laser is the so-called ruby laser which has an active element fabricated of aluminum oxide doped with chromium. The ruby laser produces an output radiation in pulse form which is in the red area of the visible portion of the electromagnetic wave spectrum. A known optical laser having an active element fabricated of a crystal of calcium fluoride doped with trivalent uranium produces an output radiation in the infrared region of the electromagnetic wave spectrum and another known optical laser having an active element fabricated of a crystal of calcium fluoride doped with divalent samarium produces an output radiation which is also in the red area of the visible spectrum. More recently other solid state lasers, for example, a laser having a barium titanate crystal doped with trivalent uranium, have been produced.

The chromium atoms present in the active element of the ruby laser which provide the stimulated emission have predominantly three different energy states, that is, a ground state, a metastable state and an excitation state. The trivalent uranium and divalent samarium atoms present in the active elements of the calcium fluoride lasers have predominantly four energy states, that is, a ground state, an excitation state, a metastable state and a terminating state. In the three energy level active elements fluorescence occurs between the metastable state and the ground state whereas in the four energy level active elements fluorescence occurs between the metastable state and the terminating state which is somewhat above the ground state. When certain radiation energy is applied to one or more surfaces of the active elements of the lasers, the atoms are pumped from the ground state to the excitation state. The atoms in the excitation state undergo a non-radiative transition when passing from the excitation state to the metastable state. Fluorescent transition is then produced by stimulated emission between the metastable state and the ground state in the three energy level active elements and between the metastable state and the terminating state in the four energy level active elements. When the laser is in a quiescent state, that is when pumping power is not applied to the active element, the population of the various states in the active element is such that almost all of the atoms in the material are at the ground state. As is known, in order to produce the desired stimulated emission and resulting oscillation to realize the high intensity coherent output, it is necessary to supply sufficient pumping energy to the active element to achieve a population inversion between the two states between which the fluorescent transition is produced in the active element. When the fluorescent transition is produced between the metastable state and the ground state it is necessary that a very large number, that is, more than half, of the active atoms initially present in the ground state be pumped into the excitation state. These excited atoms then relax to the metastable state, as mentioned hereinabove, before fluorescence is produced. In the four energy level active element of the laser the terminating state is normally essentially depopulated. As a result of the sparse population in the terminating state only a relatively small number of atoms need be pumped to the excitation state and leak back to the metastable state in order to achieve a population inversion between the metastable state and the terminating state. Accordingly, it has been found that only about $\frac{1}{500}$ of the pumping power necessary to provide oscillations in the three energy level active element is required to provide oscillations in the four energy level active element. Since considerably less pumping power is necessary to provide oscillations in the four energy level active element it has been found that continuous wave operation is possible in the solid state lasers using the four energy level active elements, whereas only a pulsed output has been produced in the three energy level active element.

Even though it is possible to provide a continuous wave output from the lasers utilizing the four energy level active elements it has been found that the pumping power is still sufficiently great so as to prevent continuous wave oscillations for an indefinite length of time. The prior art active elements of the lasers have taken the form of a Fabry-Perot interferometer and are known as the Fabry-Perot resonators in the lasers. The Fabry-Perot resonators have been shown and described in the above mentioned U.S. Patent 2,929,922 and copending U.S. patent applications, Serial No. 73,878 and Serial No. 75,296 now U.S. Patents Nos. 3,130,254 and 3,229,221, respectively. In the Fabry-Perot resonator opposite ends of the active element are made parallel to each other and a reflective coating is applied thereto so as to repeatedly reflect the rays in the resonator between the two ends thereof. This reflective coating on at least one of the two ends has a small percentage of transmissivity so as to provide an output for the laser. Heretofore the reflecting surface in the Fabry-Perot resonator has been provided by either applying a silver film to each of the opposite end surfaces of the resonator or by using multiple dielectric layers. A high degree of parallelism is required between the opposite or reflective ends of the resonator so that the rays being reflected between these ends will not walk off, that is, will not have a component normal to the axis of the crystal passing through the two reflective ends, and, thus, pass through the surfaces of the resonators connecting the reflecting ends rather than passing through the output end of the crystal. Furthermore, it is known that even when utilizing the best techniques for applying silver film or multiple dielectric layers a portion of the rays are absorbed rather than reflected by these reflecting surfaces, the absorption being considerable in the ultraviolet region of the spectrum. Thus, the efficiency of the laser is impaired.

It is, therefore, an object of this invention to provide improved optical masers or lasers.

Another object of this invention is to provide improved active elements for optical masers or lasers.

A further object of this invention is to provide improved solid state optical masers or lasers.

Yet a further object of this invention is to improve the efficiency of optical masers or lasers.

Yet another object of this invention is to provide active elements for optical masers or lasers which do not require silver or multiple dielectric layers.

Still a further object of this invention is to provide an active element for lasers which damps all modes except a selected few which are highly favored for laser operation.

Still another object of this invention is to provide improved optical masers or lasers which do not require the use of Fabry-Perot resonators.

A still further object of this invention is to provide a simple, more economical and more efficient optical maser or laser.

Still another object of this invention is to provide optical masers or lasers which utilize active elements providing total reflection of selected rays.

In accordance with the present invention an optical maser or laser is provided which includes an active element having an index of refraction and a geometrical configuration such that rays are internally therein by striking successive faces at angles greater than the critical angle until they arrive at an output area at a predetermined location on the surface of the active element.

An important advantage of this invention is that a laser is provided having a resonator wherein total reflection of selected rays is produced before the rays arrive at the output of the laser and, therefore, the amount of pumping light required to produce stimulated emission is reduced.

An important feature of the laser of the present invention is that it provides an active element for a laser which does not require the application thereto of silver or multiple dielectric layers.

The foregoing and other objects, features and advantages of the invention will be apparent from the following more particular description of preferred embodiments of the invention, as illustrated in the accompanying drawings.

Figure 4:
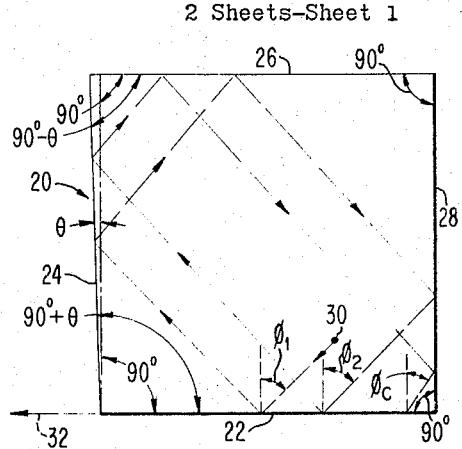
Figure 2:
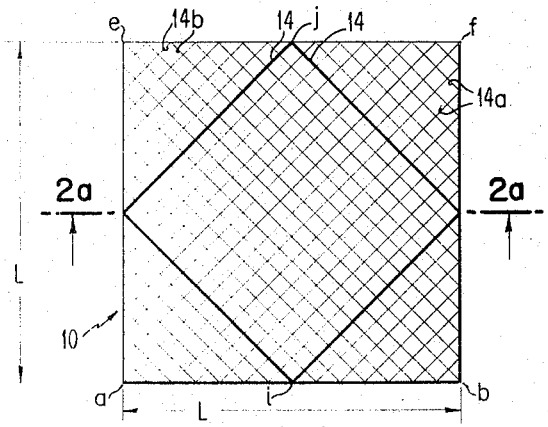
Figure 2A:
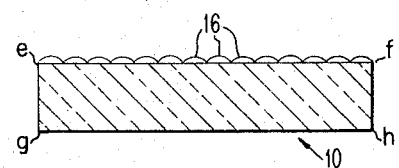
Figure 3:
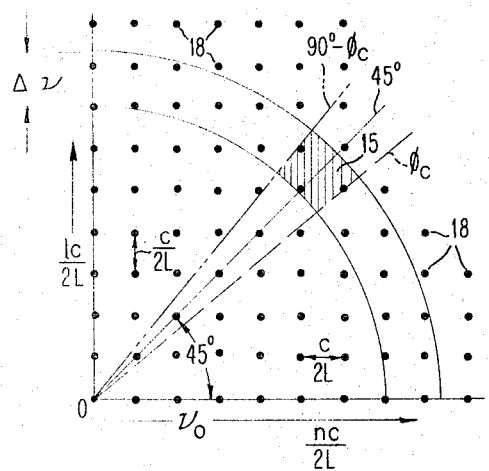
Figure 5:
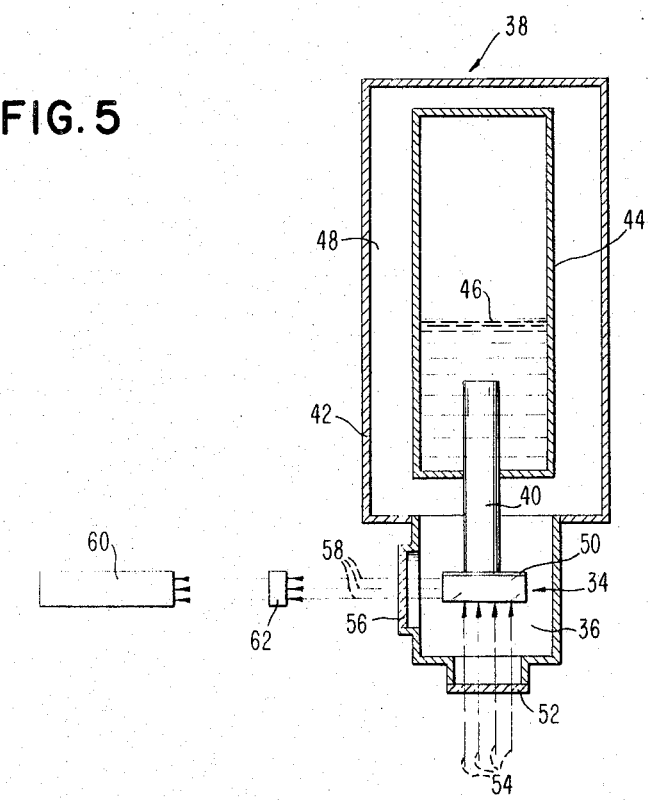
Figure 6:
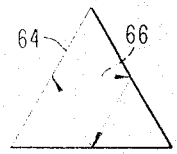
Figure 7:
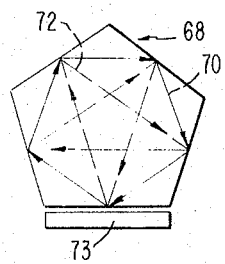
Figure 8:
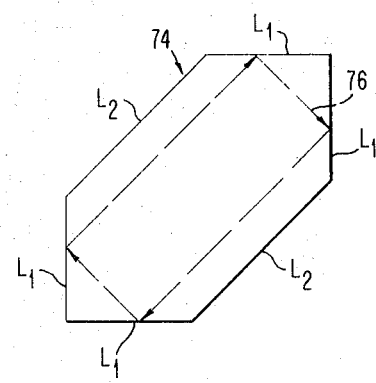

In the drawings:

FIG. 1 is a perspective of a solid state resonator of a laser of the present invention in the form of a rectangular parallelepiped having a square cross section, FIG. 2 is the plan view of the solid state resonator shown in FIG. 1 indicating the voltage distribution throughout the resonator when pumping radiation is applied thereto, FIG. 2a is a cross section taken through line 2a of the resonator shown in FIG. 2, FIG. 3 is a graph indicating a range of frequencies of output signals which may be produced by the resonator shown in FIGS. 1, 2 and 2a having material providing a given critical angle $\phi_c$ for internally reflected rays, FIG. 4 shows a section of a parallelepiped taken in a plane passing through four faces of the parallelepiped perpendicularly thereto forming a trapezoid and indicating a path for rays internally reflected therein, FIG. 5 is a schematic representation of one embodiment of a laser utilizing the resonator illustrated in FIG. 1 when operated at extremely low temperatures in accordance with the present invention, FIG. 6 indicates a path for rays internally reflected in a resonator having a triangular cross section, FIG. 7 indicates paths for rays internally reflected in a resonator having a cross section in the form of a regular pentagon, and FIG. 8 indicates a path for internally reflected rays in a resonator having a cross section in the form of a hexagon which is neither an equiangular nor equilateral hexagon.

Referring to the drawings in more detail, FIG. 1 shows an embodiment of an active element 10 of a laser of the present invention. The active element 10 is a rectangular parallelepiped having a square cross section and defined by the vertices or corners $a$, $b$, $o$, $d$, $e$, $f$, $g$ and $h$. The face $abcd$ lies in the XZ plane and the face $aoeg$ lies in the YZ plane, face $bdfh$ being perpendicular to face $abcd$ and face $egfh$ being perpendicular to face $aoeg$. A first end $odgh$ of the active element 10 lies in the XY plane and the opposite or second end $abef$ of the active element 10 is parallel to end $odgh$ but need not be necessarily parallel thereto. The dimensions of the active element 10 may be, for example, 5 mm. x 5 mm. x 2.5 mm.

Pumping radiation 12 is applied to the first end $odgh$ of the active element 10 for exciting atoms in the active element. The energy level of the excited atoms is increased to the excitation state when an amount of radiation exceeding a given threshold value for the active element 10 is applied to the end $odgh$. The atoms in the excitation state automatically relax to the metastable state via a non-radiative transition. A fluorescent transition then takes place between the metastable state and the ground state of the atoms in the active element 10 if the active element 10 is a crystal having primarily three energy levels, such as, the ruby crystal, and between the metastable state and the terminating state if the crystal is a four energy level crystal, such as, the calcium fluoride crystal doped with trivalent uranium or samarium. In the four energy level crystal a non-radiative transition also takes place between the termination state and the ground state.

In order to excite the atoms, an active element or crystal having a high Q is desirable so that the atoms readily reach the excitation state. The Q may be considered as the ratio of the intensity of the EM energy of the optical waves and the power loss per unit volume of the crystal. Rays traveling in the crystal for only a short distance before they pass into medium surrounding the crystal do not readily produce stimulated emission in the crystal and, therefore, the crystal provides a low Q for these rays. In a crystal of the type shown in FIG. 1 a large number of rays strike the faces and ends of the active element 10 at angles greater and less than the critical angle. It can be seen in FIG. 2 that if the path of a ray is that indicated by the heavy line 14 and if the angle of incidence of the ray is greater than the critical angle, the active element 10 provides a high Q for the rays following the path 14 since the rays will be totally reflected at each of the four faces of the active element 10 when the faces are optically smooth and each of the faces is disposed exactly 90 degrees with respect to its adjacent faces.

Assuming the rays in the path 14 shown in FIG. 2 are plane polarized with their electric field vectors perpendicular to the plane of the paper and the rays have an angle of incidence of 45 degrees, if 45 degrees is greater than the critical angle of the material of the active element 10, the ray is internally reflected with little, approximately 1 part in one million, or no loss of energy. On the other hand if rays are internally incident at an angle less than the critical angle they are partially transmitted out of the active element 10. If rays are internally incident at an angle only slightly greater than the critical angle the reflected amplitude is the same as the incident amplitude.

It can be seen in FIG. 2 that the rays in path 14 having an angle of incidence of 45 degrees which is greater than the critical angle of the material of the active element 10 are successively reflected by each of the faces *aoeg, egfh, bdfh* and *abcd* and since there is little or no loss of energy of these rays, the active element provides a high Q for the rays in path 14. It can also be seen in FIG. 2 that there are many other paths, for example paths 14a and 14b, parallel to path 14 along which rays travel which provide the same angles of incidence for rays traveling therein. Thus, by applying proper pumping radiation 12 to the active element 10 a mode field is produced in the active element 10. This mode field may be considered as having the pattern indicated in FIG. 2 and FIG. 2a, which shows a cross section of the active element 10 taken through line 2a of FIG. 2, where the lines such as lines 14, 14a and 14b indicate nulls of standing waves with the areas between the lines having varying voltage magnitudes or gradients as indicated by wave 16 in FIG. 2a. The voltage distribution along the other diagonal line, between points *i* and *j*, of the square formed by path 14 in FIG. 2 is similar to that indicated by wave 16, and the voltage distribution along lines parallel to either of these diagonal lines spaced an integral number of half wavelengths therefrom is also similar to that indicated by wave 16.

The voltage distribution indicated at the end or surface *abef* of the active element 10 in FIGS. 2 and 2a is also the voltage distribution in any plane in the active element 10 parallel to the surface *abef*. This field is produced in a manner similar to the fields produced by microwaves in a cavity having a rectangular geometry except that the boundary condition $E_z=0$ at $x=0$ and $x=L$, and $y=0$ and $y=L$, where $E_z$ is an electric field vector and L is the distance from the origin 0 equal to the length of a side of the cross section of the active element 10 shown in FIGS. 1, 2 and 2a, which holds in a microwave cavity is replaced by the condition that $E_z$ is a maximum at $x=0$ and $x=L$, and $y=0$ and $y=L$. Thus, for the TE optical modes $$E_y = 0$$

$$E_z = \frac{k_2}{k} \cos k_2 y \cos k_1 x$$

$$E_x = 0$$

$$H_y = \frac{k_2 k_1}{k^2} \cos k_2 y \sin k_1 x$$

$$H_z = 0$$

$$H_x = \frac{k_2^2}{k^2} \sin k_2 y \cos k_1 x$$

$$k_2 = \frac{l\pi}{L}, \; k_1 = \frac{n\pi}{L}$$

$$k^2 = k_1^2 + k_2^2$$

where $E_y$ and $E_x$ are also electric field vectors, $H_y$, $H_z$ and $H_x$ are magnetic field vectors, $k_1$ and $k_2$ are constants and $l$ and $n$ are integers. FIG. 2 of the drawing indicates a single mode which is produced in the active element 10 but it should be understood that a large number of modes can be produced simultaneously in the active element 10.

FIG. 3 of the drawing is a graphical representation of modes which may be produced in the active element 10 having the geometry illustrated in FIGS. 1, 2 and 2a. Each mode is indicated by one of the dots 18 in FIG. 3.

The vertical and horizontal distances between two adjacent dots 18 on the graph are equal to $c/2L$, where $c$ is equal to the speed of the radiation in the material of the active element, and the maximum number of dots in a column is equal to 1 and the maximum number of dots in a row is equal to $n$. The frequency $\nu$ of a mode is equal the radial distance from the mode point as represented by a dot to the origin 0 of the graph. Thus, each of the resonant frequencies or the frequency of each mode in the prism illustrated in FIGS. 1, 2 and 2a may be determined by $$\lambda = \frac{2L}{\sqrt{l^2+n^2}}$$

or $$\nu = \frac{c}{\lambda} = \frac{c\sqrt{l^2+n^2}}{2L}$$

where $\lambda$ is the wavelength, $\nu$ is the frequency and $c$ is the speed of the radiation in the material. The critical angle $\phi_c$ of the material of the active element 10 is indicated in the graph by the line $\phi_c$ and since the cross sectional area of the active element 10 is a square with each of the corners forming a 90° angle the range of angles of the rays within the active element 10 which will provide a high Q in the crystal is the difference between $\phi_c$ and $90°-\phi_c$. Thus, it can be seen that the angle of 45 degrees bisects the wedge within which stimulated emission can be produced. Since $\sin \phi_c$ is equal to the reciprocal of the index of refraction, $n_0$, it is evident that as the index of refraction, $n_0$, of the material of the active element 10 approaches $\sin 45°$ or $\sqrt{2}$ both boundary angles $\phi_c$ and $90°-\phi_c$ converge to 45° and thus the number of high Q optical modes is reduced. Accordingly, it also can be seen that the optical maser or laser active element 10 should have an index of refraction as close as possible to, but not less than $\sqrt{2}$. Suitable crystals which may be used are calcium fluoride, strontium fluoride and barium fluoride which have indices of refraction of 1.434, 1.438 and 1.474, respectively, which are just slightly greater than the $\sqrt{2}$ or 1.414. These indices of refraction are for 5892.62 A. light. In the laser the mode into which stimulated emission takes place must have a frequency which lies not only within the wedge defined by $\phi_c$ and $90°-\phi_c$ as indicated in the graph of FIG. 3 but it must also lie within the linewidth $\Delta \nu$ of the optical atomic transition which supplies the energy needed to build up a coherent oscillation in the mode. In FIG. 3 there is indicated by the annular region $\Delta \nu$ the modes into which spontaneous emission can occur. The intersection of this annular region $\Delta \nu$ with the angular region $\phi_c$ to $90°-\phi_c$ is the region of possible coherent oscillation modes in the active element 10 illustrated in FIGS. 1, 2 and 2a of the drawing. This region is indicated in FIG. 3 of the drawing as a hatched region 15. By making the dimension L small enough and by matching the index of refraction of the material of the active element 10 by embedding the active element 10 in a liquid of index of refraction $n_1$ so that $$\left(\frac{n_0}{n_1} - \sqrt{2}\right) \ll 1$$

then the number of modes indicated in the hatched region by the dots 18 can be reduced to a relatively small number, even to just one dot.

If the active element is surrounded by air or is in a vacuum, an estimate of the number of modes M lying in a hatched region 15 of an active element can easily be made by use of the formula:

$$M = \frac{16L^2 \nu \Delta \nu \Delta n_0}{c^2 \sqrt{2}}$$

where $\Delta n_0$ is $n_0 - \sqrt{2}$, assuming a refractive index close to the value of $\sqrt{2}$. For the following values:

$\Delta n_0 = .016$
$\Delta \nu = .2$ cm.$^{-1} = .2$ A. ($\lambda = 10{,}000$ A.)
$\nu = 3 \times 10^{14}$ ($\lambda = 10{,}000$ A.)
and
$L = \tfrac{1}{2}$ cm.

it can be found that $\phi_c - (90° - \phi_c) = .01$ radian or $.57°$ and that M is approximately equal to 90 modes. If the length L of the side of the square cross section of the active element is reduced to a millimeter, then M is equal to approximately 3 modes. This shows that the smaller the physical size of the active element can be the better is the mode selection. The pumping power requirements are also less stringent for the smaller dimensions of the prism.

In the discussion, hereinabove, of the active element of the present invention the active element has been described as one having a square cross section. It should be understood however, that the crystal may be in the form of a rectangular block having $x$ and $y$ dimensions of $L_1$ and $L_2$, respectively, instead of both being equal to L. Thus the resonant frequencies in the rectangular block having dimensions $L_1$ and $L_2$ are found to be $$\lambda = \frac{2}{\sqrt{\frac{l^2}{L_1^2} + \frac{n^2}{L_2^2}}}$$

or $$\nu = \frac{c}{\lambda} = \frac{c\sqrt{\frac{l^2}{L_1^2} + \frac{n^2}{L_2^2}}}{2}$$

The modes may now be plotted in a manner similar to those plotted in FIG. 3 of the drawing but the vertical distance between adjacent modes will be equal to $c/2L_1$ and the horizontal distance between two adjacent modes will be equal to $c/2L_2$. Thus, it can be seen that prisms having both square cross sections and rectangular cross sections may be used to produce stimulated emission in accordance with the teachings of the present invention.

Since it is very difficult to produce an active element which has faces that form exactly 90° angles with adjacent faces, the paths of the rays generally do not appear as indicated in FIGS. 2 and 2a, i.e., a ray starting from a given point in path 14 of FIG. 2 will not return to the given point after being reflected only once by each of the four sides of the active element 10. An example of an active element of a laser of the present invention which does not have faces forming angles of exactly 90° is illustrated in cross section in FIG. 4 of the drawing. This active element 20 has four faces indicated by lines 22, 24, 26 and 28, with the angle formed by lines 22 and 28 being 90°, by lines 26 and 28 being 90°, by lines 22 and 24 being $90° + \theta$, and by lines 24 and 26 being $90° - \theta$. In the active element 20 shown in FIG. 4, a ray originating at point 30 strikes the face 22 at an angle of incidence $\phi_1$, which is greater than the critical angle $\phi_c$, is reflected by faces 24, 26 and 28 before it again strikes face 22 but now at an angle $\phi_2$, which is less than the angle $\phi_1$ but greater than the critical angle $\phi_c$ and after striking the face 22 at the angle $\phi_2$ it again is reflected by each of the other faces 24, 26 and 28 before it strikes face 22 a third time at any angle of incidence $\phi_c$, the critical angle. Since the ray strikes face 22 at the critical angle $\phi_c$ the ray will be refracted out of the active element 20 along face 22 in the direction indicated by the arrow 32 to provide a beam of radiation in the form of a sheet having a width determined by the face 22 of the active element 20.

Although the face 22 has been selected as the output face of the active element 20, it should be understood that the output face may be any one of the four faces of the active element depending upon the geometry or imperfections in the construction of the active element. It also should be understood that a ray following the path illustrated in FIG. 4 need not have originated at point 30 but could have originated at any point prior to point 30 since it can be seen that the path illustrated in FIG. 4 is only a portion of a complete path which can cover virtually all of the cross sectional area of the active element 20. Since the rays travel through the active element 20 not only in the direction indicated by the arrows within the active element but also in the opposite direction, a mode pattern will be produced in the active element 20 somewhat similar to the mode pattern shown in FIGS. 2 and 2a with the optical energy leaking out of the active element along one face thereof in the manner described hereinabove. Accordingly, it can be seen that the rays are reflected by adjacent faces for a large number of revolutions within the active element before they are transmitted out of the active element 20. While the rays are traveling through the active element 20 atoms are being continuously excited by pumping radiation applied to an end of the active element 20 in the manner described in connection with the active element illustrated in FIGS. 1, 2 and 2a. Thus, a large number of the atoms can be readily elevated to the excitation state to thereafter produce fluorescence which can be detected in the path of the arrow 32. Since the rays are totally reflected at each of the faces of the active element until the critical angle is reached it can be seen that the active element 20 of the laser of the present invention provides a highly efficient means for producing coherent monochromatic radiation.

FIG. 5 is a diagrammatic representation of one embodiment of an optical maser or laser utilizing an active element of the type illustrated in FIGS. 1, 2 and 2a or in FIG. 3 of the drawing when operated at extremely low temperatures. An active element 34 is disposed in a chamber 36 of a dewar 38. The active element 34 is supported in the chamber 36 by being attached to a conductive rod or "cold finger" 40. The dewar 38 has an outer container 42 and an inner container 44 which is partially filled with, for example, liquid helium 46. A vacuum is maintained in the space 48 between the outer container 42 and the inner container 44. Since the conductive rod or cold finger 40 passes through the liquid helium 46 in the inner container 44 this rod 40 is essentially at 4.2° K., which is the boiling point for liquid helium at atmospheric pressure, and thus the temperature of the active element 34 is approximately 4.2° K. If it is desired to operate the active element 34 at 77° K., the liquid helium 46 is replaced with liquid nitrogen which boils at 77° K. The conductive rod or cold finger is preferably made of brass so that the active element 34 is at a temperature which is very close to the liquid helium temperature. To more readily attach the conductive rod 40 to the active element 34 and to more efficiently reduce the temperature of the active element 34 to approximately that of the liquid helium, there is disposed at the upper surface of the active element 34 a dielectric coating or chrome plate 50.

The chamber 36 is provided with a first window 52 through which pumping light 54 may pass so as to be applied to the bottom or lower end of the atcive element 34. A second window 56 is provided in the chamber 36 of the dewar 38 so as to permit coherent output radiation 58 to pass to a light detector 60 after passing through a suitable filter 62. The filter 62 is provided so as to permit only the desired monochromatic coherent light to be applied to the detector 60. The pumping light 54 may be provided by any suitable source, for example, a mercury vapor lamp or a xenon discharge lamp actuated under the control of a bank of charged condensers (not shown)

which discharge each time that the lamp is fired and then automatically recharge, or any other suitable lamp providing pumping radiation from the desired portion of the electromagnetic wave spectrum depending upon the material used as the active element 34.

In the operation of the laser illustrated in FIG. 5 of the drawing, when the liquid helium has cooled the active element 34 to approximately 4.2° K., the intensity of the pumping radiation 54 is increased until it exceeds at the surface of the active element 34 the threshold value at which oscillations are produced in the active element 34 providing the coherent output radiation 58. If the active element 34 is the so-called ruby crystal or active element of the ruby laser the output will be in the form of pulses but if the active element is a calcium fluoride crystal doped with trivalent uranium or samarium the output may be in continuous wave form.

FIGS. 1, 2, 2a and 3 of the drawing illustrate the resonator or active element of the laser of the present invention in the form of a rectangular parallelepiped having a cross section in a plane passing perpendicularly with respect to four of the faces thereof in the form of a square, or substantially in square form. It should be understood that geometrical configurations other than those illustrated in FIGS. 1, 2, 2a and 3 may be used for the resonators or active elements in accordance with the present invention.

In FIG. 6 there is illustrated an active element 64 having a geometrical configuration of rectangular parallelepiped which has a cross sectional area in the form of an equilateral triangle. It can be seen that a path 66 for internally reflected rays in this parallelepiped 64 also forms an equilateral triangle with the rays in the path 66 striking the three faces of the active element 64 at an angle of incidence of 30 degrees. A material which can be used for the active element 64 illustrated in FIG. 6 of the drawing is a rutile crystal which has an index of refraction of 2.85 and, therefore, a critical angle of approximately 21 degrees.

Another geometrical configuration which the resonator or active element of the laser of the present invention may take is indicated in FIG. 7 of the drawing which illustrates the cross sectional area of an active element 68 in the form of a regular pentagon. The rays produced by the atoms therein which are stimulated to the excitation state may follow a first path 70 to strike the sides of the pentagon at an angle of incidence of 54 degrees. To utilize the rays moving through this path 70 the active element 68 should be made of, for example, lithium fluoride which may be doped with hexavalent uranium. The index of refraction of lithium fluoride is 1.37 and, therefore, the critical angle is approximately 47 degrees.

The rays produced by atoms which are stimulated to the excitation state may also follow a second path 72 which forms a basically different pattern than that of path 70. It can be seen by following the second path 72, which is indicated by dashed lines, that the rays following this path 72 will travel at times in a direction which is parallel to a given side of the pentagon and then strike the side adjacent the given side at an angle of incidence of 18 degrees which is less than the angle of incidence of the rays in the first path 70. When the rays in the second path 72, or paths parallel thereto, are to be utilized the material for the active element 68 should provide a critical angle of less than 18 degrees and thus must have an index of refraction which is even higher than that of rutile.

The embodiments of the active elements for the lasers of the present invention have been hereinabove described and illustrated as right prisms having cross sections thereof taken in a plane perpendicular to the faces of the prisms which are at least substantially equiangular and equilateral polygons. For active elements having this type of a geometrical configuration the index of refraction $n_0$ should be equal to $$\frac{1}{\sin\left(\frac{(N-2)\pi}{2N}\right)}$$

where N is equal to the number of sides of the polygon. If the active element is immersed in a medium having an index of refraction $n_1$, the ratio $n_0/n_1$ should be equal to $$\frac{1}{\sin\left(\frac{(N-2)\pi}{2N}\right)}$$

The active elements of the lasers of the present invention illustrated in FIGS. 1, 2, 2a and 4 have been described as lasers having a high Q and there is disclosed in connection with the active element illustrated in FIG. 4 the manner in which coherent radiation is transmitted out of the active element. It should be understood that the coherent radiation produced in the active elements illustrated in FIGS. 1, 2, 2a, 6 and 7 may be coupled out of the active element by providing a perturbation on or in a portion of a face of the element. This perturbation may take the form of, for example, a protuberance on or a groove in the active element to direct the radiation into the surrounding medium in any known manner. Alternatively, the coherent radiation may be coupled out of the active element by positioning to within about one wavelength of one face thereof a body of material 73 shown in FIG. 7 of the drawing having an index of refraction similar to that of the active element and having any desired geometry for directing radiation therethrough to a desired location in a known manner.

It should also be understood that this invention is not limited to active elements having cross sections which are regular polygons. In FIG. 8 there is shown an active element 74 having a geometrical configuration of a prism with a cross sectional area in the form of a hexagon which is neither equiangular nor equilateral. Four of the six sides of the hexagon are equal in length and are identified as $L_1$ and the remaining two sides, which are opposite to each other, are shown as each having a length $L_2$ which is longer than the length of the sides $L_1$. Although the sides $L_2$ are shown as being longer than the sides $L_1$ it should be understood that the length of the sides $L_2$ may be shorter than the length of $L_1$. The angles formed between sides $L_1$ in FIG. 8 are 90°, thus, it can be seen that the lines of a path 76 when drawn parallel to the sides $L_2$ will meet the sides $L_1$ at an angle of 45 degrees so that rays moving along the path 76 will strike each of the sides $L_1$ at an angle of 45 degrees. Accordingly, it can be seen that the active element having the geometrical configuration illustrated in FIG. 8 may be made of the same material of which the active elements illustrated in FIGS. 1, 2, 2a and 4 are made of, for example, calcium fluoride which has an index of refraction of 1.43, providing a critical angle of approximately 44 degrees. As in the active elements illustrated or indicated in the other figures of the drawing, the useful rays for providing stimulated emission in a laser are not limited to the rays traveling in the path 76. In view of the above description in connection with the other active elements illustrated in the drawing, it can be seen that other paths can be followed by the rays which will provide multiple internal reflections before the rays reach the critical angle or a perturbation on or in the active element and are transmitted out of the active element in accordance with refraction principles.

It should further be understood that the invention is not limited to the geometrical configurations hereinabove illustrated or described. Any geometrical configuration may be utilized which will provide internal reflections of the rays a sufficient number of times to produce stimulated emission when appropriate pumping radiation is applied to the surface of the active element. The smoothness of the reflecting faces of the active elements should be such that the internal reflections of a ray are readily produced a large number of times. Furthermore, the index of refraction of the material and the geometrical configuration of the active element may be such that the useful rays in the laser operation strike successive or adjacent faces of the active element or follow a path which bypasses one or more intermediate faces between two successive reflecting points.

Although the active elements of the lasers of the present invention have been described as solid state active elements it should be understood that appropriate materials in other states may be used. For example, the material of the active element may be a liquid in which case the container for the liquid would provide the desired geometrical configuration. The index of refraction of the container could be similar to that of the liquid.

While the invention has been particularly shown and described with reference to preferred embodiments thereof, it will be understood by those skilled in the art that various changes in form and details may be made therein without departing from the spirit and scope of the invention.

What is claimed is:

1. A laser comprising an active element having a population inversion characteristic and an index of refraction greater than 1.414,
    means for exciting said element to produce coherent radiation therein parallel to a given axis of said element, one end of said element having optically smooth sides forming an angle of 90° arranged to reflect said radiation through said element parallel to said given axis by total internal reflection, said element having additional sides arranged substantially parallel to said given axis,
    means disposed at the opposite end of said element for reflecting said radiation through said element to form an optical cavity for said radiation with said optically smooth sides, and means for extracting radiation from said cavity.

2. A laser as set forth in claim 1 wherein said parallel sides entirely surround said radiation parallel to said given axis.

3. A laser as set forth in claim 1 wherein said optically smooth surfaces include two planar surfaces forming an angle of 90°.

4. A laser as set forth in claim 1 wherein said parallel sides are substantially longer than said optically smooth sides.

5. A laser comprising an active element having a population inversion characteristic and being made of a material having a given critical angle,
    means for exciting said element to produce coherent radiation therein passing in a given direction, said element having sides substantially parallel to said radiation of given direction entirely surrounding said radiation,
    means forming an optical cavity for said radiation, said cavity means including an end of said element having two optically smooth sides forming an angle of 90°, each of said optically smooth sides being disposed to receive said radiation of given direction at an angle greater than said critical angle to internally reflect said radiation to the other of said two sides and to the opposite end of said element, said opposite end of said element including means for reflecting said radiation back through said element parallel to said radiation passing in said given direction, and
    means for extracting said radiation from said cavity means.

6. A laser as set forth in claim 5 wherein each of said two optically smooth sides are planar surfaces.

References Cited by the Examiner

UNITED STATES PATENTS

| 2,907,958 | 10/1959 | Skaggs | 88—1 |
| 2,929,922 | 3/1960 | Schawlow et al. | 88—1 |
| 3,059,117 | 10/1962 | Boyle et al. | 88—1 |
| 3,140,451 | 7/1964 | Fox | 331—94.5 |
| 3,215,949 | 11/1965 | Garrett | 331—94.5 |

OTHER REFERENCES

Sorokin et al., "Stimulated Infrared Emission From Trivalent Uranium," Physical Review Letters, vol. 5, No. 12, Dec. 15, 1960, pp. 557–559.

JEWELL H. PEDERSEN, *Primary Examiner.*

R. L. WIBERT, *Assistant Examiner.*